(12) United States Patent
Grobe

(10) Patent No.: US 9,917,640 B2
(45) Date of Patent: Mar. 13, 2018

(54) OPTICAL COUPLER DEVICE AND AN OPTICAL MONITORING DEVICE FOR MONITORING ONE OR MORE OPTICAL POINT-TO-POINT TRANSMISSION LINKS

(71) Applicant: ADVA Optical Networking SE, Meiningen (DE)

(72) Inventor: Klaus Grobe, Planegg (DE)

(73) Assignee: Adva Optical Networking SE, Meiningen (DE)

( * ) Notice: Subject to any disclaimer, the term of this patent is extended or adjusted under 35 U.S.C. 154(b) by 98 days.

(21) Appl. No.: 14/750,225

(22) Filed: Jun. 25, 2015

(65) Prior Publication Data

US 2015/0381275 A1    Dec. 31, 2015

(30) Foreign Application Priority Data

Jun. 26, 2014  (EP) .................................... 14002194

(51) Int. Cl.
*H04B 10/07*   (2013.01)
*H04B 10/079*   (2013.01)
(Continued)

(52) U.S. Cl.
CPC ... *H04B 10/07955* (2013.01); *G02B 6/29395* (2013.01); *G02B 6/355* (2013.01);
(Continued)

(58) Field of Classification Search
CPC .. G02B 6/29395; G02B 6/355; G02B 6/3576; G02B 6/293; G02B 6/35;
(Continued)

(56) References Cited

U.S. PATENT DOCUMENTS 3,981,592 A * 9/1976 Williams ................ G01B 11/02
356/5.01
4,545,253 A * 10/1985 Avicola .............. G01D 5/35383
250/231.19
(Continued)

FOREIGN PATENT DOCUMENTS

WO       2008010866 A2    1/2008

*Primary Examiner* — Ken N Vanderpuye
*Assistant Examiner* — Dibson Sanchez
(74) *Attorney, Agent, or Firm* — The Webb Law Firm

(57) ABSTRACT

Disclosed is an optical coupler device, especially for monitoring purposes in an optical point-to-point transmission link, which includes a first, a second and a third optical port and is configured to transmit a first optical signal received at the first optical port to the second optical port and to transmit a second optical signal received at the second optical port to the first and third optical port according to a monitoring split ratio with respect to the optical power of the second optical signal, the first and second optical signal having a wavelength lying in a first optical band. The device is further configured to transmit a third and a fourth optical signal received at the third and the second optical port to the respective other optical port, the third and fourth optical signal having a wavelength lying in a second optical band. The device is controllable with respect to the monitoring split ratio and includes a control means adapted to receive a control signal. The control means controls the optical coupler device with respect to the monitoring split ratio such that in a first work the second optical signal is transmitted to the first optical port, only, and in a second work mode a major portion of the optical power of the second signal is transmitted to the first optical port and a minor portion of the optical power of the second signal is transmitted to the third optical port.

18 Claims, 5 Drawing Sheets

(51) Int. Cl.
  *H04B 10/071* (2013.01)
  *H04B 10/075* (2013.01)
  *G02B 6/293* (2006.01)
  *G02B 6/35* (2006.01)
  *H04J 14/02* (2006.01)
  *H04L 5/14* (2006.01)

(52) U.S. Cl.
  CPC ......... *G02B 6/3576* (2013.01); *H04B 10/071* (2013.01); *H04B 10/075* (2013.01); *H04J 14/0221* (2013.01); *H04J 14/0227* (2013.01); *H04L 5/14* (2013.01)

(58) Field of Classification Search
  CPC ............ H04B 10/07955; H04B 10/075; H04B 10/071; H04B 10/079; H04J 14/0227; H04J 14/0221; H04J 14/02; H04L 5/14
  USPC ....................................................... 398/9–38
  See application file for complete search history.

(56) References Cited

U.S. PATENT DOCUMENTS

| | | | | |
|---|---|---|---|---|
| 5,136,669 A | * | 8/1992 | Gerdt | G06E 3/003 385/27 |
| 5,177,354 A | * | 1/1993 | Tomita | G02B 6/29368 356/73.1 |
| 5,282,257 A | * | 1/1994 | Ota | G02B 6/125 385/24 |
| 5,319,482 A | * | 6/1994 | Tsuchiya | H04B 10/071 356/73.1 |
| 5,491,574 A | * | 2/1996 | Shipley | G01M 11/3136 398/13 |
| 5,649,037 A | * | 7/1997 | Ohyama | H04B 10/071 385/24 |
| 5,771,250 A | * | 6/1998 | Shigehara | G01M 11/3136 398/195 |
| 6,269,204 B1 | * | 7/2001 | Ishikawa | G02B 6/29385 385/15 |
| 6,351,582 B1 | * | 2/2002 | Dyke | H04B 10/272 385/24 |
| 6,396,575 B1 | * | 5/2002 | Holland | G01M 11/3181 356/73.1 |
| 6,414,768 B1 | * | 7/2002 | Sakata | H04B 10/035 398/59 |
| 6,571,038 B1 | * | 5/2003 | Joyner | G02B 6/2813 385/27 |
| 6,630,992 B1 | | 10/2003 | Vobian et al. | |
| 7,684,702 B2 | * | 3/2010 | Lu | H04B 10/0773 398/33 |
| 8,532,447 B1 | * | 9/2013 | Kwakernaak | G02B 6/125 385/31 |
| 2003/0021516 A1 | * | 1/2003 | Pafchek | G02B 6/12007 385/14 |
| 2003/0174961 A1 | * | 9/2003 | Hamada | B82Y 20/00 385/48 |
| 2005/0019031 A1 | * | 1/2005 | Ye | H04B 10/077 398/19 |
| 2005/0088964 A1 | * | 4/2005 | Yang | H04J 14/0283 370/216 |
| 2005/0111783 A1 | * | 5/2005 | Thackara | G02F 1/1326 385/16 |
| 2006/0007426 A1 | * | 1/2006 | Weller | H04B 10/0771 356/73.1 |
| 2007/0116467 A1 | | 5/2007 | Kwon et al. | |
| 2010/0054740 A1 | * | 3/2010 | Lee | H04J 14/0226 398/68 |
| 2011/0102776 A1 | * | 5/2011 | Hasegawa | G01M 11/3136 356/124.5 |
| 2012/0328293 A1 | * | 12/2012 | Grobe | H04B 10/272 398/58 |
| 2013/0094857 A1 | * | 4/2013 | Hinderthur | H04Q 11/0067 398/58 |
| 2014/0161445 A1 | | 6/2014 | Jeong et al. | |
| 2016/0112136 A1 | * | 4/2016 | Urban | H04B 10/2504 398/66 |

* cited by examiner

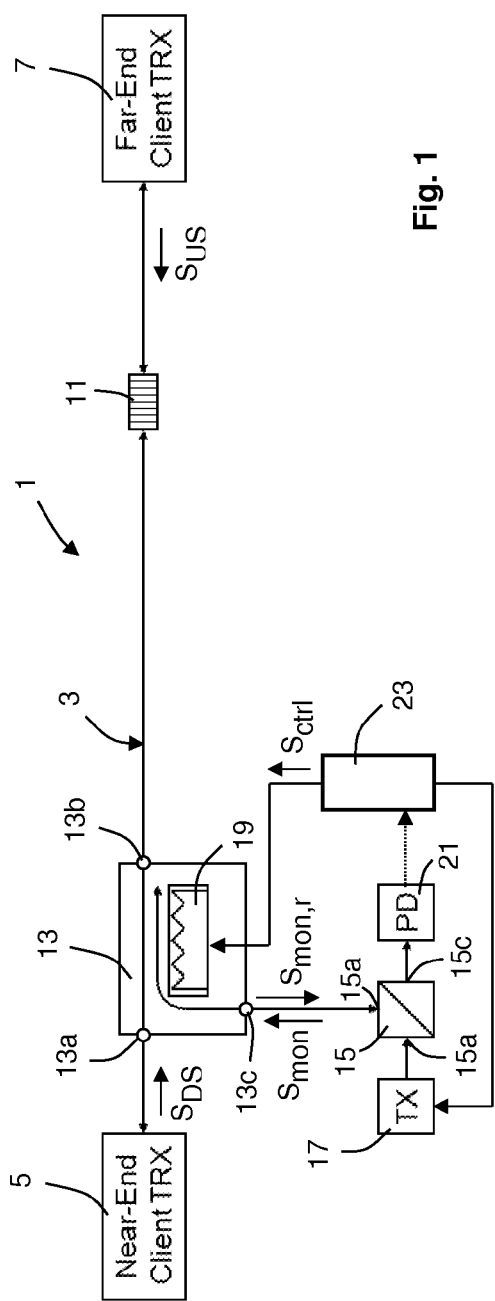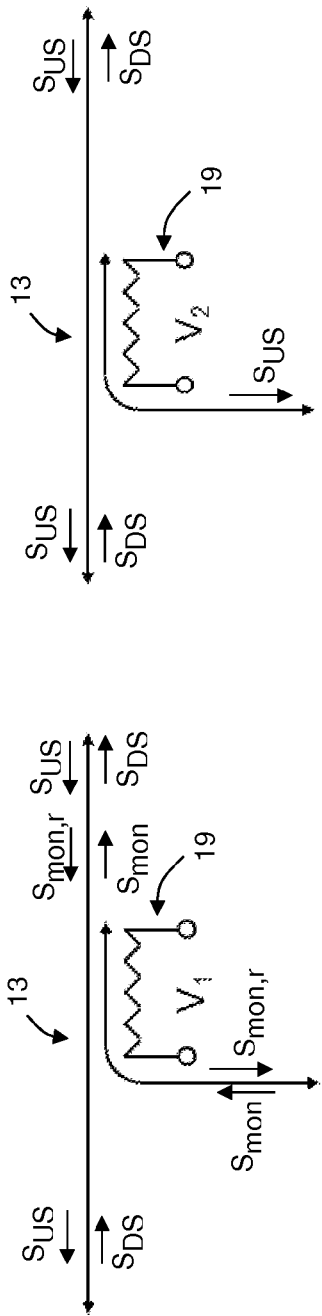

OPTICAL COUPLER DEVICE AND AN OPTICAL MONITORING DEVICE FOR MONITORING ONE OR MORE OPTICAL POINT-TO-POINT TRANSMISSION LINKS

The invention relates to an optical coupler device, especially for monitoring purposes in an optical point-to-point transmission link, comprising the features of the pre-characterizing portion of claim 1. Further, the invention relates to an optical monitoring device for monitoring an optical point-to-point transmission link and to an optical monitoring device for monitoring a plurality of optical point-to-point transmission links comprising the features of the pre-characterizing portion of claims 6 and 8, respectively.

In optical fiber networks there is the demand for low-cost monitoring of the physical fiber links of a transmission link as well as the monitoring of the presence of an optical signal supplied to the fiber link at its far end. Monitoring is to be effected at a near end of the transmission link or the physical fiber link, respectively.

Monitoring the physical fiber link including monitoring of reflections and attenuation as a function of the fiber length can be done by using an optical time domain reflectometer (OTDR). This method is widely used in optical fiber networks and also in passive optical networks (PONs). However, for multiple dedicated access lines, an optical switch is required to selectively monitor a predetermined one of the access lines, as providing a dedicated OTDR for each access line is inacceptable with respect to costs. Additional monitoring of the presence of the far-end signal would require further equipment.

Integrating an OTDR functionality in the transceivers used for the transmission links, which is generally possible, requires access to the transceivers, which might not be possible, e.g. for providers of the physical fiber-optic network.

It is further known to use fiber-optic taps having an asymmetrical splitting ratio in order to tap off a small portion, e.g. 1 to 3%, for monitoring the far-end signal presence as well as signal parameters of the far-end signal. However, the fiber-optic tap introduces an undesired attenuation into the fiber-optic link even at times at which no signal monitoring is required.

Thus, it is an object of the present invention to provide an optical coupler device, especially for monitoring purposes in an optical point-to-point (PtP) transmission link, which can be used to realize a monitoring device which makes it possible to controllably monitor the presence or parameters of a far-end optical signal and the fiber-optic link with respect to at least one predetermined fiber parameter by using a monitoring signal having a wavelength different from the far-end optical signal or the fiber-optic link, only. These two monitoring tasks can be effected simultaneously. Of course, a selected one of these two tasks may be carried out at a time, only.

It is a further object of the invention to provide monitoring devices for monitoring a single and a plurality of optical point-to-point transmission links comprising a single and a plurality of such optical coupler devices, respectively.

These objects are achieved by the subject-matter of the independent claims. Preferred embodiments are defined in the sub-claims.

An optical coupler device according to the present invention is a controllable optical three-port device having two states which in the following are designated as the first and second work modes. It comprises a first, a second and a third optical port and is configured to transmit a first optical signal received at the first optical port to the second optical port and to transmit a second optical signal received at the second optical port to the first and third optical port according to a monitoring split ratio with respect to the optical power of the second optical signal, the first and second optical signal having a wavelength lying in a first optical band. The optical coupler device is further configured to transmit a third and a fourth optical signal received at the third and the second optical port to the respective other optical port, the third and fourth optical signal having a wavelength lying in a second optical band. According to the invention, the optical coupler device is controllable with respect to the monitoring split ratio and it comprises a control means adapted to receive a control signal and configured to control the optical coupler device with respect to the monitoring split ratio in such a way that in a first work mode the second optical signal is transmitted to the first optical port, only, and in a second work mode a major portion of the optical power of the second signal is transmitted to the first optical port and a minor portion of the optical power of the second signal is transmitted to the third optical port.

Of course, the first and second optical signals as well as the third and fourth optical signals having wavelengths comprised by the first and second optical band, respectively, may be identical or different.

In general, it has been common knowledge that the split ratio of an optical coupler or splitter is dependent on other parameters, e.g. the temperature. However, resulting from this knowledge, as the only reaction efforts have been made to avoid negative effects produced by these dependencies, e.g. by stabilizing the temperature of the optical coupler. The invention, however, intentionally uses the dependency of the split ratio of a wavelength-dependent optical coupler device in order to provide a device which can be controlled to work in two work modes.

According to an embodiment of the invention, the optical coupler device comprises a wavelength-dependent 1×2 coupler. The optical coupler may be realized in polymer technology or as fused-silica coupler, but, of course, an expert in the field of designing wavelength-dependent optical couplers may decide to realize a coupler according to the invention in any other known and suitable technology.

In a preferred embodiment, the wavelength-dependent 1×2 coupler may be realized as a temperature-sensitive coupler and the control means may be realized as a heating and/or cooling device, which is thermally coupled with the temperature-sensitive coupler and adapted to switch the optical coupler device between the two work modes depending on the control signal received.

According to an embodiment of the invention, the optical coupler device may be realized by using simpler components, e.g. comprising a wavelength-independent preferably asymmetrical optical power splitter having a common port and a first and a second splitting port, the optical power splitter being controllable with respect to the splitting ratio, and a first and a second optical diplexer each having a WDM port and a first and a second band port, each optical diplexer being configured to receive an optical signal in the first and second optical band at the first and second band port, respectively, and to output the optical signals at the WDM port, and to output optical signals in the first and second optical band which are received at the WDM port at the first and second band port, respectively, wherein the first splitting port of the optical power splitter is connected to or defines the first optical port of the optical coupler device, wherein the second splitting port is connected to the first band port of the first optical diplexer, wherein the common port of the optical power splitter is connected to the first band port of the second optical diplexer, wherein the second band port of the second optical diplexer is connected to the second band port of the first optical diplexer, wherein the WDM port of the second optical diplexer is connected to or defines the second optical port of the optical coupler device and wherein the WDM port of the first optical diplexer is connected to or defines the third optical port of the optical coupler device.

In this embodiment, the optical coupler device according to the invention comprises a simple wavelength-independent optical power splitter instead of a wavelength-dependent power splitter. Such a wavelength-independent optical power splitter (i.e. wavelength-independent within a given wavelength range, which is not too broad) is much easier to design and manufacture than a more complex wavelength-dependent coupler having the property that a variation of a control parameter, e.g. the temperature, merely influences the split ratio in a first band, whereas in a second band, which comprises the wavelength of the monitoring signal, essentially the total optical power of a respective optical signal is transmitted to the respective port irrespective of the work mode defined by the control means.

As mentioned above, the controllable optical power splitter may be realized as a temperature-sensitive power splitter and the control means may be realized as a heating and/or cooling device, which is thermally coupled with the temperature-sensitive power splitter and configured to switch the optical coupler device between the two work modes depending on the control signal received.

An optical monitoring device according to the invention for monitoring an optical point-to-point transmission link comprises an optical coupler device according the invention as described above, the first and second port of the optical coupler device being connected to or defining a first and a second port of the monitoring device; an optical transmitter adapted to create an optical monitoring signal at a wavelength lying in the second optical band of the optical coupler device; an optical receiver capable of receiving signals lying in the first and second optical bands; and a passive optical splitter/combiner having a common port and a first and a second splitting port, the common port being connected to the third port of the optical coupler device, the first splitting port being connected to an optical output port of the optical transmitter and the second splitting port being connected to an optical input port of the optical receiver, the passive optical splitter/combiner being configured to transmit to the common port at least a portion of the optical power of the optical monitoring signal created by the optical transmitter and supplied to the first splitting port and to transmit to the second splitting port at least a portion of the optical power of an optical signal supplied to the common port. The passive splitter/combiner may be e.g. realized as 3 dB coupler or as optical circulator.

The first and second ports of the optical monitoring device are adapted to be connected to a first end, e.g. a near end, and to a second end, e.g. a far end of an optical point-to-point transmission link to be monitored. The wavelengths of the optical signals used for a downstream transmission (i.e. for the direction from the first to the second end) and an upstream transmission (i.e. for the direction from the second to the first end), respectively, may be identical or different as far as they are comprised by the first optical band. As the optical monitoring device is configured to transmit an optical monitoring signal, which is to be understood as the third optical signal supplied to the third port of the optical coupler device, and to receive a portion of the monitoring signal reflected and/or (back-) scattered in the point-to-point transmission link to be monitored, the fourth signal as defined above in connection with the optical coupler device has the same wavelength as the third signal.

In a simple embodiment, the optical monitoring device does not comprise a control unit for controlling the function of the optical transmitter and the controllable optical coupler device (or the control means thereof) and, as the case may be, the optical receiver.

Control ports of these components may be adapted to be connected to an external control unit, which supplies respective control signals to these components, e.g. an activation signal to the optical transmitter for switching on/off the optical monitoring signal (and, as the case may be, for controlling the optical power of the monitoring signal or the wavelength of the monitoring signal), a control signal for the control means of the optical coupler device for determining the work mode, or a tuning signal for the optical receiver for determining the wavelength or wavelength band of an optical receive signal that can be detected.

In a more complex embodiment, the optical monitoring device may comprise such a control unit. The control unit may especially be configured to control the optical transmitter and the optical coupler device to work in a first and a second monitoring mode, wherein in the first monitoring mode the optical transmitter creates a monitoring signal and the optical coupler device is in the first work mode, and in the second monitoring mode the optical transmitter is deactivated and the at least one optical coupler device is in the second work mode.

An optical monitoring device according to the invention for monitoring a plurality of optical point-to-point transmission links comprises a plurality of optical coupler devices according to the invention as described above, each of which is configured to be connected to a first end, preferably a near end, and a second end, preferably a far end, of a dedicated optical point-to-point transmission link; an optical transmitter arrangement having a plurality of output ports and being adapted to create, at each output port, an optical monitoring signal, each of which has a wavelength lying in the second optical band of the optical coupler device; an optical receiver arrangement having a plurality of input ports and being adapted to receive, at each input port, an optical signal having a wavelength lying in the first and second optical bands; and a plurality of passive optical splitter/combiners, each of which is dedicated to one of the optical coupler devices, each passive optical splitter/combiner having a common port and a first and a second splitting port, the common port being connected to the third port of the dedicated optical coupler device, the first splitting port being connected to a dedicated optical output port of the optical transmitter arrangement and the second splitting port being connected to a dedicated optical input port of the optical receiver arrangement, each passive optical splitter/combiner being configured to transmit to the common port at least a portion of the optical power of the optical signal created by the optical transmitter arrangement and received at the first splitting port and to transmit to the second splitting port at least a portion of the optical power of the optical signal received at the common port. Each of the passive splitter/combiner may be e.g. realized as 3 dB coupler or as optical circulator.

The first and second ports of each of the optical monitoring devices are adapted to be connected to a first end, e.g. a near end, and to a second end, e.g. a far end, of a selected one of the optical point-to-point transmission links to be monitored. The wavelengths of the optical signals used for each downstream transmission (i.e. for the direction from the first to the second end) and an upstream transmission (i.e. for the direction from the second to the first end), respectively, may be identical or different as far as they are comprised by the first optical band of the respective optical coupler device. As the optical monitoring device is configured to transmit an optical monitoring signal for each of the optical point-to-point transmission links to be monitored, there are several different ways to realize the transmitter arrangement. Correspondingly, there are several alternatives to realize the receiver arrangement depending on the specific realization of the transmitter arrangement.

In an embodiment simpler to realize, the optical monitoring device for monitoring a plurality of optical point-to-point transmission links does not comprise a control unit for controlling the function of the optical transmitter arrangement and the controllable optical coupler devices (or the control means thereof) and, as the case may be, the optical receiver arrangement. Control ports of these components or arrangements may be adapted to be connected to an external control unit, which supplies respective control signals to these components, e.g. one or more activation signals to the optical transmitter arrangement for switching on/off one or more selected or all optical monitoring signals (and, as the case may be, for controlling the optical power of one or more selected or all of the monitoring signals or the wavelengths of one or more selected or all of the monitoring signals), one or more control signals for the control means of the optical coupler devices for determining the work mode of one or more selected or all of the optical coupler devices, or one or more tuning signals for the optical receiver arrangement for determining the wavelengths or wavelength bands of one or more selected or all of the optical receive signals that can be detected.

In a more complex embodiment, the optical monitoring device for monitoring a plurality of optical point-to-point transmission links further comprises a control unit being adapted to receive at least one control signal and being configured to be able to control, depending on the at least one control signal, the optical transmitter arrangement and the optical coupler devices to work in a first and a second monitoring mode with respect to one or more predetermined or all optical point-to-point transmission links, wherein in the first monitoring mode with respect to a selected optical point-to-point transmission link the optical transmitter arrangement creates a monitoring signal which is supplied to the selected optical point-to-point transmission links via the dedicated passive optical splitter/combiner and the dedicated optical coupler device, and the optical coupler device is in the first work mode, and wherein in the second monitoring mode the at least one optical transmitter arrangement does not create a monitoring signal which is supplied to the selected optical point-to-point transmission links via the dedicated passive optical splitter/combiner and the dedicated optical coupler device, and the optical coupler device is in the first work mode. Of course, each of the passive splitter/combiners may be e.g. realized as 3 dB coupler or as optical circulator.

The optical transmitter arrangement may comprise at least one optical transmitter having an output port which is connected to an input port of a dedicated optical power splitter having a predetermined number of output ports, each output port defining an output port of the optical transmitter arrangement. In this way, the monitoring signal of the at least one optical transmitter is split into a given number of identical signals that are supplied to a respective number of point-to-point transmission links to be monitored. Of course, all these monitoring signals have the same wavelength and are created at the same time. For detecting a selected monitoring signal (more precisely, a portion of the optical power reflected or backscattered within the transmission link), the receiver arrangement must be capable of selecting each of the monitoring signals separately from the other identical signals. In such an embodiment, a dedicated receiver (e.g. a dedicated photodiode) can be provided for each transmission link.

In another embodiment of the invention, the optical transmitter arrangement comprises at least one tunable optical transmitter having an output port which is connected to an input port of a dedicated optical demultiplexing device, e.g. an arrayed waveguide grating, the optical demultiplexing device having a predetermined number of output ports, each output port defining an output port of the optical transmitter arrangement, wherein the tunable optical transmitter is controllable by the control unit to create a monitoring signal having such a monitoring wavelength that the control signal is output at the output port of the optical demultiplexing device, only, which defines the output port of the optical transmitter arrangement that is dedicated to a respective dedicated optical point-to-point transmission link. In this way, a monitoring signal which is dedicated to a predetermined point-to-point transmission link and which has a predetermined wavelength can be created. In this case, the same receiver (e.g. a photo diode) may be used to detect all monitoring signals created by the tunable optical transmitter as the monitoring signal is supplied to a single predetermined transmission link, only.

The optical transmitter arrangement may, of course, comprise one or more optical transmitters having an output port, which defines an output port of the optical transmitter arrangement. That is, a separate optical transmitter is provided for a respective point-to-point transmission link to be monitored. Each of these optical transmitters may create a monitoring signal having an identical or different wavelengths. The optical transmitters may be controlled to create the monitoring signals simultaneously or at differing times.

According to an embodiment of the invention, the optical receiver arrangement comprises at least one optical receiver having an input port which is connected to an output port of a dedicated optical power splitter having a predetermined number of input ports, each input port defining an input port of the optical receiver arrangement. In this way, a single optical receiver is sufficient in order to detect the signals, i.e. the reflected or backscattered monitoring signal, supplied from a plurality of transmission links to be monitored. Of course, in this case, the transmitters and optical coupler devices must be controlled in such a way that a single signal from a selected transmission link is supplied to the optical receiver, only.

The simplest and also most flexible way to realize a receiver arrangement, however, is to provide a separate optical receiver for each transmission link to be monitored, each optical transceiver having an input port, which defines an input port of the optical receiver arrangement.

According to a further embodiment, the plurality of optical coupler devices may comprise a common control means configured to commonly control each of the plurality of optical coupler devices into the first or second work mode depending on a common control signal, the plurality of optical coupler devices preferably being realized as temperature-sensitive optical coupler devices and the common control means preferably being realized as a common heating device, each of the optical coupler devices being provided in thermal contact with the common heating device.

Further objects and advantages of the present invention will become apparent from the following description of the preferred embodiments that are given by way of example with reference to the accompanying drawings, wherein:

FIG. 1 shows a schematic block diagram of point-to-point transmission link comprising an optical monitoring device according to the invention for monitoring a single optical point-to-point transmission link, the optical monitoring device comprising a controllable optical coupling according to the invention;

FIG. 2a shows a schematic diagram of a first work mode of the controllable optical coupler device in FIG. 1 for monitoring the fiber line;

FIG. 2b shows a schematic diagram of a second work mode of the controllable optical coupler device in FIG. 1 for monitoring the far end transmission signal;

Figure 4:
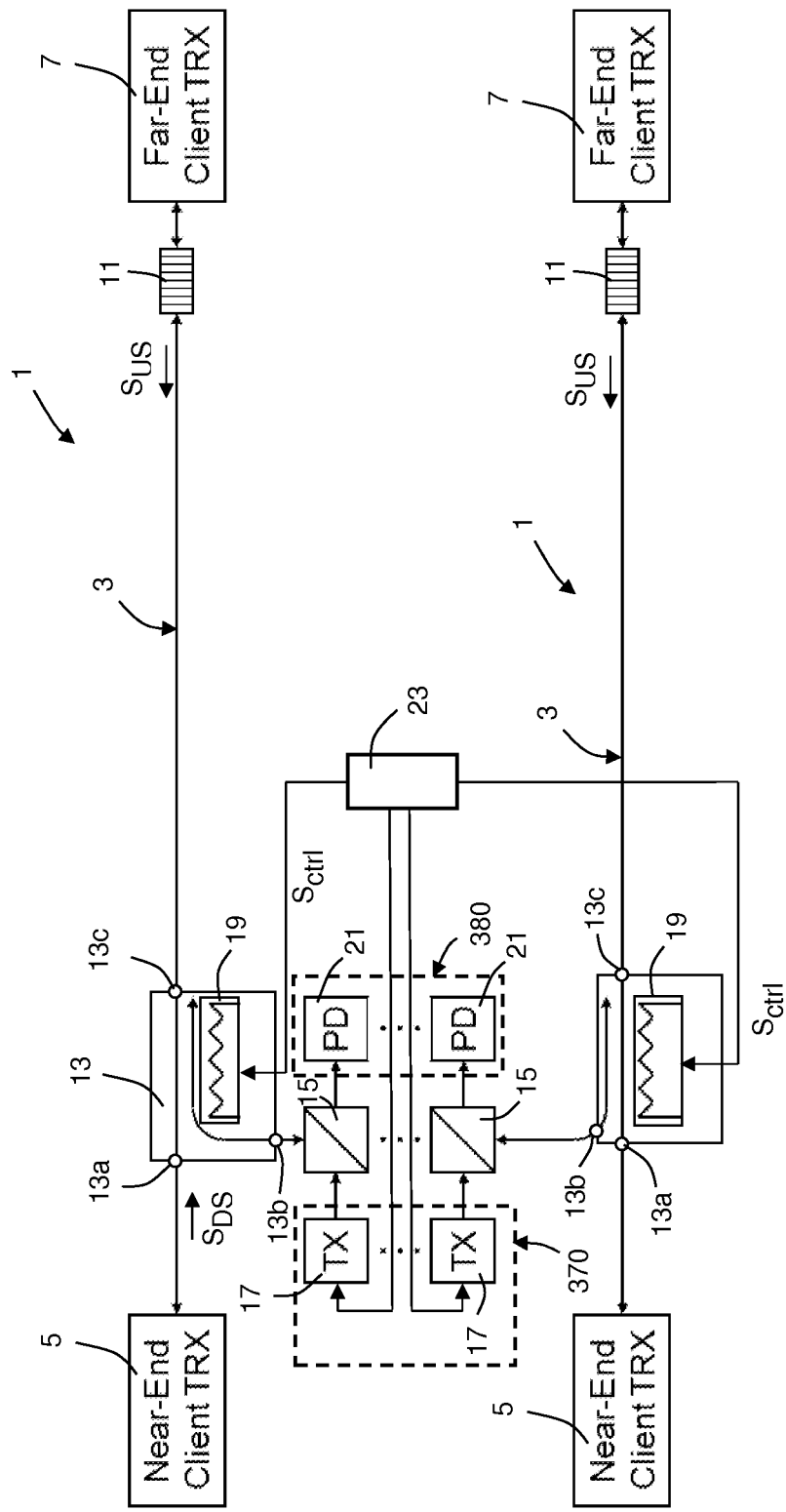
FIG. 4 shows a plurality of point-to-point transmission links each connected to an optical monitoring device for monitoring a plurality of optical point-to-point transmission links according to the invention.
Figure 5:
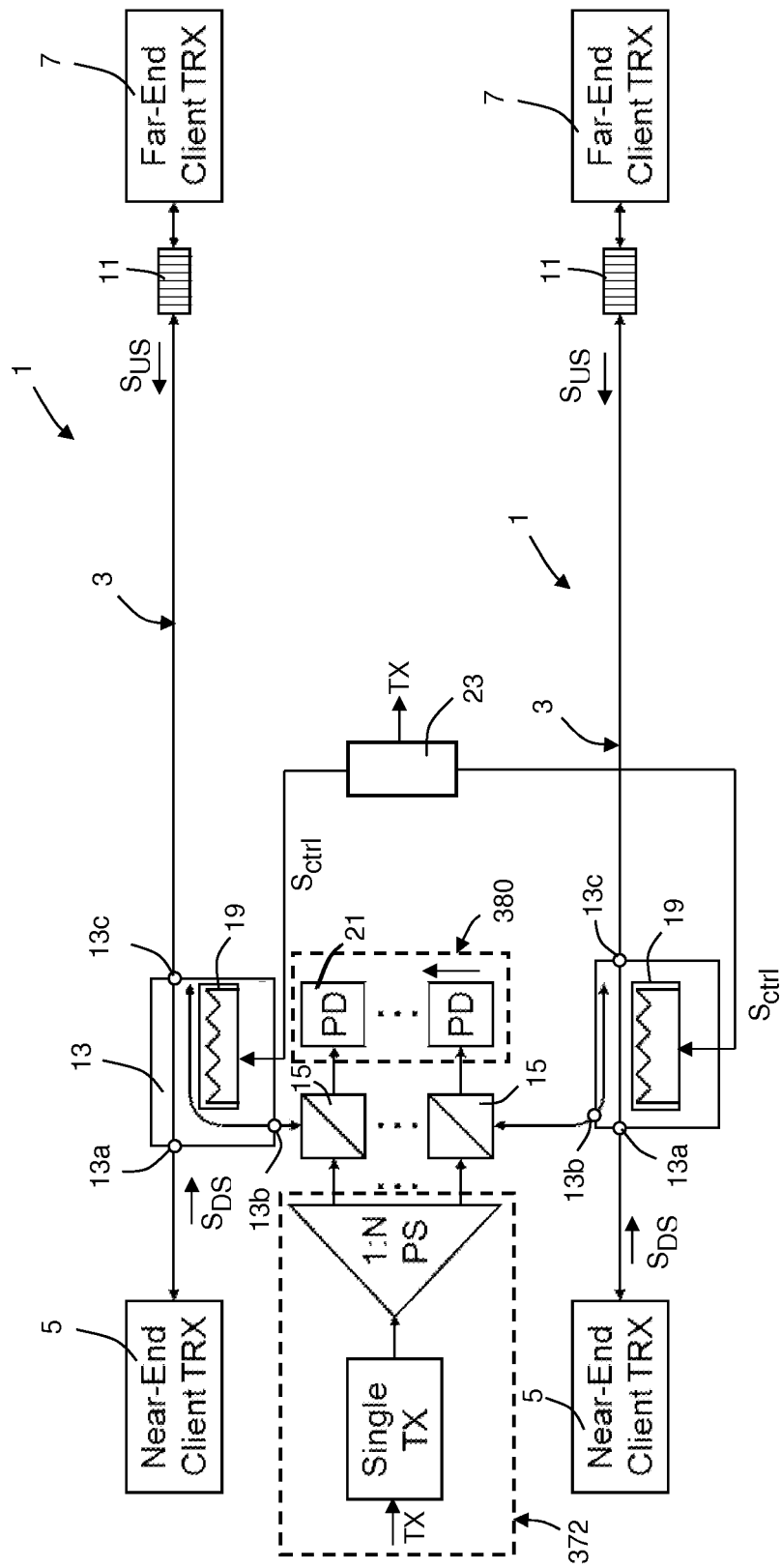
Figure 6:
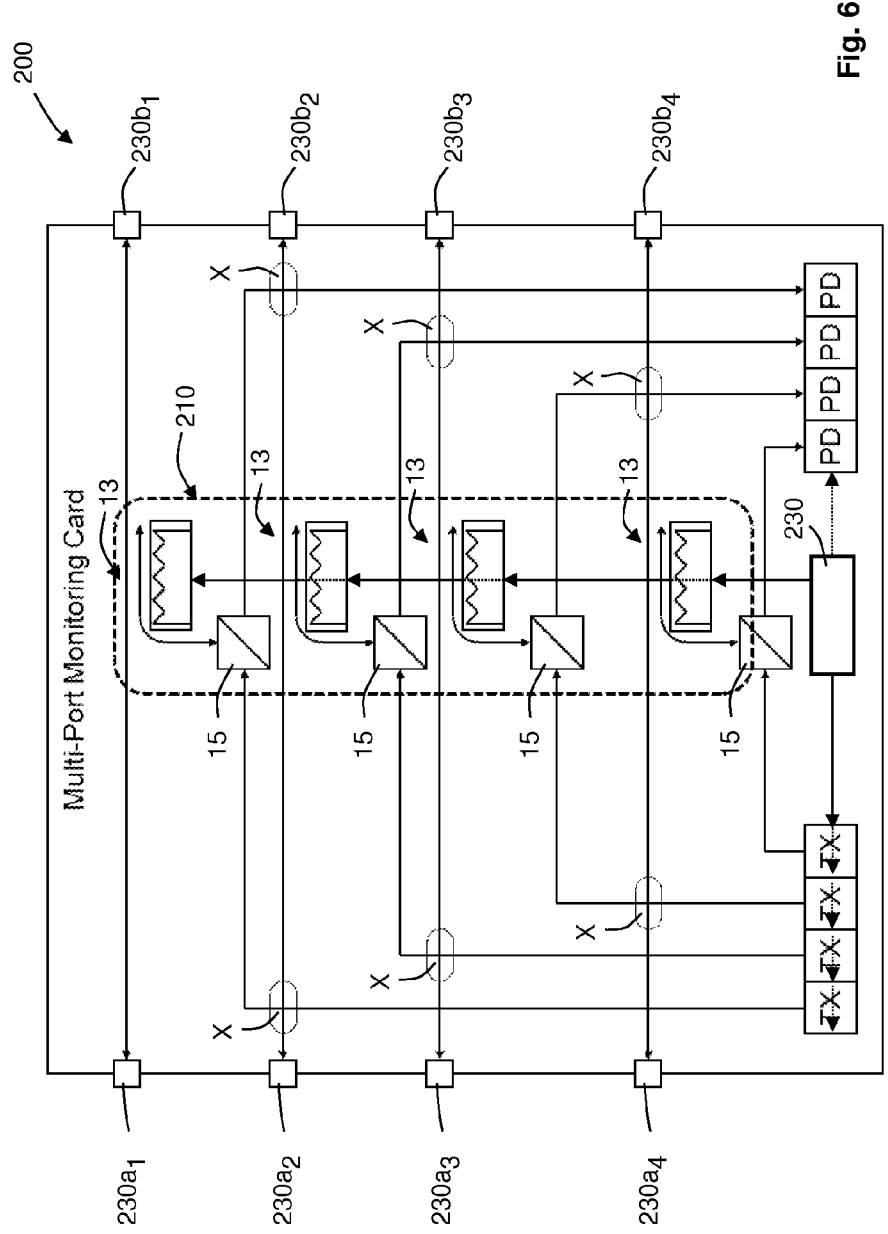

FIG. 5 shows a further embodiment of an optical monitoring device similar to FIG. 4 comprising a transmitter arrangement consisting of a single optical transmitter and an optical power splitter; and FIG. 6 an embodiment of a controllable monitoring device for monitoring a plurality of optical point-to-point transmission links according to the invention, which is provided as a multi-port monitoring card.

FIG. 1 shows a schematic block diagram of a PtP transmission link 1 comprising an optical fiber link 3 having a first end or near end connected to a first or near-end transceiver 5 and a second or far end connected to a second or far-end transceiver 7. The optical fiber link 3 consists of a single fiber 9, which is connected to the output port of the optical near-end transceiver 5 and the optical far-end transceiver 7. At the second or far end of the optical fiber link 3, an optical reflector 11 is provided, preferably close to the optical port of the far-end transceiver 7. Of course, the optical reflector 11 may also be integrated into the far-end transceiver 7, for example directly within the optical signal path that is connected to the optical port of the far-end transceiver 7.

Further, an optical coupler device 13 is provided within the near end of the optical fiber link 3.

Preferably, a bidirectional communication is established between the near-end transceiver 5 and the far-end transceiver 7 via the optical fiber link 3. However, it is within the scope of the present invention if a unidirectional communication is established between a far-end transceiver device and a near-end receiver device, only.

In the bidirectional PtP transmission link shown in FIG. 1, an optical downstream signal $S_{DS}$ is supplied to the near end of the optical fiber link 3 at the optical port of the near-end transceiver 5 and transmitted via the optical fiber link 3 to the far-end transceiver 7.

The far-end transceiver 7 receives the signal $S_{DS}$ and further processes this signal as necessary. The far-end transceiver 7 creates an optical upstream signal $S_{US}$, which is transmitted via the optical fiber link 3 to the optical port of the near-end transceiver 5. The near-end transceiver 5 receives the signal $S_{US}$ and further processes this signal as necessary.

The optical downstream signal $S_{DS}$ may be created at a downstream wavelength $\lambda_1$ whereas the optical upstream signal created by the far-end transceiver 7 may be created at an upstream wavelength $\lambda_2$. It is, however, also possible to use optical downstream and upstream signals having an identical wavelength.

It shall be mentioned that the term "wavelength" as used in this description with respect to the optical signals designates the center wavelength of the optical spectrum of the respective optical signal. Of course, an optical signal reveals a given bandwidth. If an optical laser is used as an optical transmission element within the near-end and far-end transceivers 5, 7, the bandwidth is narrow so that it is sufficient for the description of the present invention to characterize an optical signal by its (center) wavelength.

The optical reflector 11 is designed in such a way that the optical downstream and upstream signals $S_{DS}$, $S_{US}$ are transmitted over the optical reflector 11 with a sufficiently low or even no attenuation.

The optical coupler device 13 provided at the near end of the optical fiber link 3 has a first port 13a connected to the optical port of the near-end transceiver 5, a second optical port 13b connected to the respective portion of the optical fiber 9 that is connected to the optical reflector 11, and a third port 13c connected to a common port 15a of a passive optical splitter/combiner 15. A first splitting port 15b of the passive optical splitter/combiner is connected to an output port of an optical transmitter 17, for example a laser, which is configured to create an optical monitoring signal $S_{mon}$ at a monitoring wavelength $\lambda_3$.

The monitoring signal $S_{mon}$ created by the optical transmitter 17 is supplied to the optical coupler device 13 by the optical splitter/combiner 15. The optical coupler device 13 is configured to transmit the optical monitoring signal $S_{mon}$ that is received at the third optical port 13c to the second optical port 13b with a sufficiently low loss or practically at no loss. Thus, the optical monitoring signal $S_{mon}$ is transmitted in the downstream direction (i.e. in the direction to the far end of the optical fiber link 3) in addition to the downstream signal $S_{DS}$. In this respect, the optical coupler device 13 has the function of a known wavelength-dependent coupler. That is, the optical coupler device 13 is configured to pass through to the third optical port (at practically no or at a sufficiently low loss) a first signal having a wavelength lying in a first optical band received at the first optical port 13a and a second signal having a wavelength lying in a second optical band received at the third optical port 13c. Likewise, a third optical signal having a wavelength lying in the first optical band and a fourth signal lying in the second optical band that are received at the second optical port 13b are split, wherein the third optical signal is forwarded to the first optical port 13a and the fourth signal is forwarded to the third optical port 13c (at practically no or at a sufficiently low loss).

The optical coupler device 13 is configured to reveal this behavior of a usual wavelength-dependent coupler in a first work mode. In a second work mode of the optical coupler device 13, the optical coupler device shows a different behavior with respect to a signal that is received at the second optical port 13b and that has a wavelength lying in the first optical band. In this second work mode, the optical coupler device 13 reveals the function of an optical power splitter with respect to such an optical signal received at the second optical port 13b. That is, a first portion of the optical power of this signal is transmitted to the first optical port 13a and the remaining portion of the optical power (apart from a power loss which is neglected for the purpose of this description) is forwarded to the third optical port 13c. Preferably, in this second work mode, the optical coupler device 13 reveals the function of a highly asymmetric optical power splitter, that is, the main portion of the optical power of a signal having a wavelength lying in the first optical band is forwarded to the first optical port 13a whereas a minor portion is transmitted to the third optical port. The portion of the optical power transmitted to the third optical port 13c may preferably be within a range of 1 to 3%.

The optical coupler device 13 is configured with respect to these two work modes in such a way that although a given portion of the optical power of a signal having a wavelength lying in the first optical band received at the second optical port 13b is directed to the third optical port 13c, a signal having a wavelength lying in this first optical band received at the first optical port 13a (i.e. a downstream signal $S_{DS}$) is passed through to the second optical port 13b, only. That is, in this second work mode, the optical coupler device 13 additionally behaves like a directional coupler.

The optical coupler device 13 is thus an optical device having the function of a wave-length-dependent directional coupler and the function of a controllable power splitter. In order to control the optical coupler device 13 to operate in the first and second work mode, the optical coupler device comprises a control means 19 adapted to receive a control signal, for example a control voltage. The control means may be a heating and/or cooling device which is thermally coupled to an optical three-port coupler. The three-port coupler may be realized as a polymer-based 1×2 coupler or as a fused silica 1×2 coupler having the desired optical and thermal properties. The control signal $S_{ctrl}$ supplied to the control means 19 may be a control voltage or a control current, which may assume a first and a second value in order to control the optical coupler device 13 to operate in the first and second work mode, respectively. As shown in FIG. 1, the control signal $S_{ctrl}$ may be created by a control unit 23, which is connected to the control means 19. The control unit 23 may further be adapted to control the optical transmitter 17 in such a way that the monitoring signal $S_{mon}$ is created as necessary (i.e. at the predetermined time and in such a way that the control signal has the correct wavelength, power and other signal parameters as required). The control unit 23 may also be connected to the optical receiver and configured to perform any signal processing as desired, e.g. for analyzing the upstream signal with respect to its presence and/or signal parameters.

Apart from using a temperature dependency of an 1×2 coupler in order to realize a controllable optical coupler device 13, any other physical property of an optical 1×2 coupler or, generally spoken, a three-port optical device, may be used, like the dependency of a coupling ratio on the stress birefringeance of an optical element or an electro-optical effect. A suitable control means may then be realized for example as piezo element. In case of an electro-optical element used to realize the optical coupler device 13, the control means may also be (optically) integrated within a respective 1×2 coupler or any component to realize the desired three-port device.

As apparent from FIG. 1, any signal received at the second port 13b and supplied to the third port 13c of the optical coupler device 13 is received at the common port 15a of the optical splitter/combiner 15. These signals are at least partially (with respect to the optical power) output at a second splitting port 15c of the optical splitter/combiner 15 and supplied to an input port of an optical receiver 21, which may comprise a photodiode adapted to opto-electrically convert the optical signal received.

The two work modes of the optical coupler device 13 are shown in FIGS. 2a and 2b, respectively.

FIG. 2a shows the first work mode, in which a control signal $S_{ctrl}$ in form of a voltage V1 is supplied to the control means 19, which is realized as a heating and/or cooling device.

In the first work-mode of the optical coupler device 13 shown in FIG. 2a, monitoring of the optical fiber link 3 or the optical fiber 9 is possible. For this purpose, the optical transmitter 7 creates a monitoring signal $S_{mon}$ which is supplied, via the optical splitter/combiner 15, to the third port 13c of the optical coupler device 13, which outputs this monitoring signal at the second optical port 13b. The monitoring signal $S_{mon}$, which is a third optical signal according to the terminology used above, travels through the optical fiber 9 until it is reflected by the optical reflector 11. The reflected monitoring signal $S_{mon,r}$ (which is a fourth optical signal according to the terminology explained above) travels back through the optical fiber 9 and is received at the second port 13b of the optical coupler device 13. The monitoring signal is output at the third port 13c due to the wavelength dependency of the 1×2 coupler comprised by the optical coupler device 13. The reflected monitoring signal $S_{mon,r}$ is supplied to the optical receiver 21 with at least a sufficient portion of its optical power. The passive optical splitter/combiner 15 may be realized as (broadband) optical 3 dB coupler or as optical circulator. If realized as optical 3 dB coupler, the optical splitter/combiner 15 also supplies half of the portion of the optical power of the reflected monitoring signal $S_{mon,r}$ to the optical transmitter 17, which in this case needs an optical isolator in order to avoid a disturbing influence of any signal directed to the optical transmitter 17.

Of course, if no monitoring of the optical fiber link 3 or the optical fiber 9, respectively, is necessary, the optical transmitter 17 is shut off so that no monitoring signal $S_{mon}$ is created.

In the second work mode of the optical coupler device, which is shown in FIG. 2b, the control signal $S_{ctrl}$ assumes a second value, which is the voltage value $V_2$ for the heating and/or cooling device used as a control means 19 for the optical coupler device 13. This allows to monitor the present or desired signal parameters of the upstream signal $S_{US}$ created by the far-end transceiver 7, as in the second work mode the optical coupler device 13 functions as highly asymmetric optical power splitter with respect to any signal lying in the first optical band, like the upstream signal $S_{US}$.

Thus, a small portion of the optical power of the upstream signal $S_{UP}$ is output at the third optical port 13c of the optical coupler device 13 and supplied, via the optical splitter/combiner 15, to the optical receiver 21.

In this case the optical transmitter 17 does not create a monitoring signal as the reflected monitoring signal $S_{mon,r}$ would additionally be received by the optical receiver 21, which would prevent an easy and simple detection of only a single signal received. Of course, it would be possible to use an additional wavelength-dependent coupler in the path between the optical splitter/combiner 15 and the optical receiver side in order to separate signals having different wavelengths. However, in this case, two separate optical receivers or an optical switch would be necessary. A further alternative would be to use a tunable optical receiver 21 which is adapted to filter the desired optical signal to be actually detected, i.e. either the reflected monitoring signal $S_{mon,r}$ or the upstream signal $S_{US}$ (more precisely, the split-off power portion). With such additional effort, simultaneous or quasi-simultaneous monitoring of the optical fiber link 3 using the monitoring signal $S_{mon}$ and monitoring of the upstream signal $S_{US}$ would in general be possible.

In this respect, it shall be mentioned that the optical coupler device 13 is adapted to fully transmit any signal having a wavelength lying in the second optical band, like the reflected monitoring signal $S_{mon,\,r}$ received at the second optical port 13b, to the third optical port 13c if the optical coupler device 13 is controlled to operate in the second work mode in which a portion of the upstream signal $S_{US}$ is also output at the third optical port 13c.

It is to be noted that the optical coupler device 13 may be used for any other application different from the monitoring tasks as described above or below. As already explained above, in another application the third and fourth optical signals may not necessarily have the same wavelengths. In general, it is merely required that the third and fourth wavelengths are comprised within the same, i.e. the second optical band.

Figure 3:
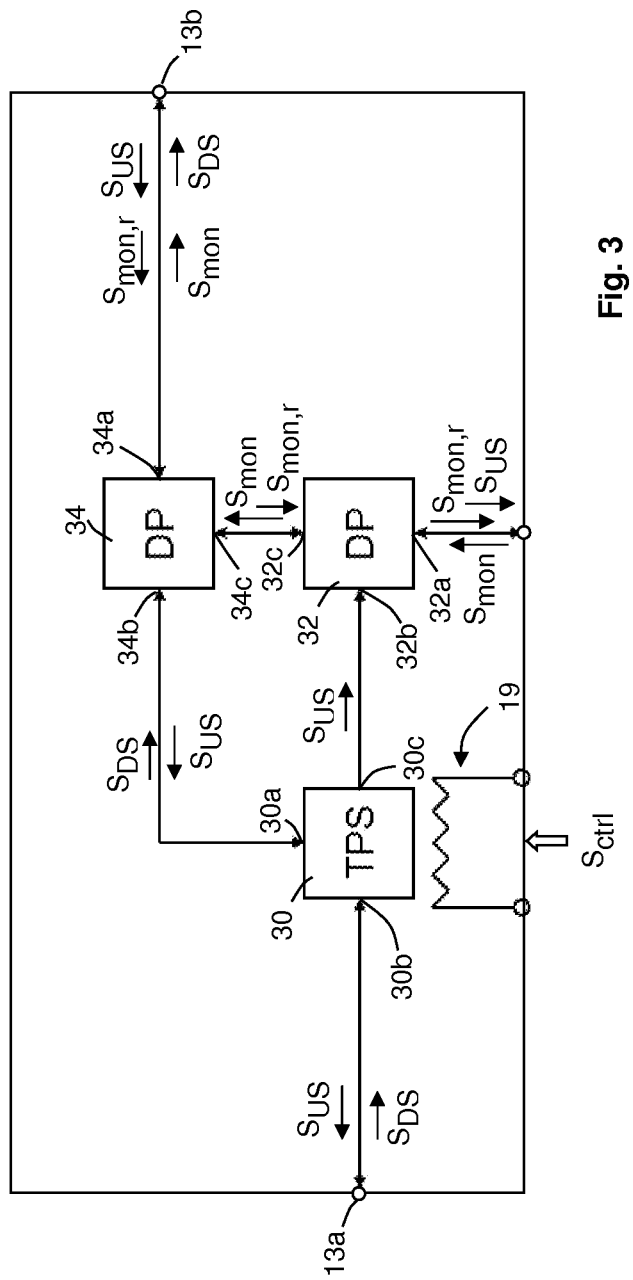
FIG. 3 shows an equivalent circuit diagram of the controllable optical coupler device in FIGS. 1 and 2.

FIG. 3 shows an equivalent circuit of the controllable optical coupler device in FIGS. 1 and 2. Of course, the optical coupler device 13 may in practice be realized according to this equivalent circuit diagram using the respective components.

The optical coupler device 13 in FIG. 3 comprises a wavelength-independent preferably asymmetrical optical power splitter having a common port 30a and a first and a second splitting port 30b, 30c, respectively. The optical power splitter 30 is controllable with respect to its splitting ratio through control means 19. The control means 19 and the wavelength-independent optical power splitter 30 may be realized as explained above in connection with the wavelength-dependent controllable optical three-port device. The optical power splitter 30 may be realized as fused silica coupler or using polymer technology.

Further, the optical coupler device 13 in FIG. 3 comprises a first and a second optical diplexer 32, 34 each having a WDM port 32a, 34a and a first and a second band port 32b, 34b and 32c, 34c, respectively. Each of the optical diplexers 32, 34 is configured to receive an optical signal in the first and the second optical band (in which the downstream signal $S_{DS}$ and the upstream signal $S_{US}$ and the monitoring signal $S_{mon}$ lie, respectively) at the first and the second band port, respectively, and to output these optical signals at the WDM port. Further, each optical diplexer 32, 34 is configured to output optical signals in the first and second optical band which are received at the WDM port at the first and second band port, respectively.

As apparent from FIG. 3, the first splitting port 30b of the optical power splitter 30 is connected to or defines the first optical port 13a of the optical coupler device 13. The second splitting port 30c of the optical power splitter is connected to the first band port 32b of the first optical diplexer 32. The common port 30a of the optical power splitter 30 is connected to the first band port 34b of the second optical diplexer 34. The second band port 34c of the second optical diplexer 34 is connected to the second band port 32c of the first optical diplexer 32. The WDM port 34a of the second optical diplexer 34 is connected to or defines the second optical port 13b of the optical coupler device 13. The WDM port 32a of the first optical diplexer 32 is connected to or defines the third optical port 13c of the optical coupler device 13.

The course of the signals $S_{DS}$, $S_{US}$, $S_{mon,\,r}$, $S_{mon}$ is also shown in FIG. 3, the situation for both work modes being integrated in this Figure.

The downstream signal $S_{DS}$ supplied to the port 13a is, in both work modes passed through to the optical port 13b of the optical coupler device 13 via the optical power splitter 30 and the second optical diplexer 34. Likewise, in both work modes, the monitoring signal $S_{mon}$ supplied to the third optical port 13c is supplied to the second optical port 13b via the first and second optical diplexers 32, 34, and the reflected monitoring signal $S_{mon,\,r}$ received at the second optical port 13b is output at the third optical port 13c via the second and first optical diplexers 34, 32.

In the first work mode, the upstream signal $S_{US}$ received at the second optical port 13b is output at the first optical port 13a via the second optical diplexer 34 and the optical power splitter 30. In this first work mode, the controllable optical power splitter 30 does not split off a desired portion of the optical power of the upstream signal $S_{US}$ which would be output at the second splitting port 30c.

When the optical power splitter 30 is controlled to work in its second work mode by supplying a suitable control signal $S_{ctrl}$ to the control means 19, the optical power splitter 30 splits off a desired portion of the optical power of the upstream signal $S_{US}$, for example a portion of 1 to 3% of the optical power of the signal received, and supplies this split-off portion of the signal $S_{US}$ to the second splitting port 30c. As a result, this signal $S_{US}$ is output at the third port 13c of the optical coupler device 13 via the first optical diplexer 32. It shall be mentioned that, for reasons of simplicity, the split-off portion of the optical upstream signal $S_{US}$ is also designated as $S_{US}$.

In practice, this equivalent circuit diagram can be used to design and manufacture an optical coupler device 13 using separate components. These separate components may also be realized by using any integrated optics technology.

FIG. 4 shows a plurality of PtP transmission links 1, each of which is monitored as explained above with respect to FIG. 1 in case of a single PtP transmission link 1. Of course, each monitoring device consisting of the respective optical coupler device 13, the optical transmitter 17, the optical splitter/combiner 15 and the optical receiver 21 may be realized as a unit in case the near ends of the transmission links 1 are at the same location, for example in an optical line terminal. The control unit 23 may in this case be configured to take all tasks as described above in connection with the monitoring of the single transmission link 1 in FIG. 1. In this case, a transmitter arrangement 370 having a given number of optical output ports consists of the optical transmitters 17, the output ports of each of the transmitters 17 defining an output port of the transmitter arrangement. A receiver arrangement 380 having a given number of optical input ports consists of the optical receivers 21.

In the embodiment shown in FIG. 4, each of the monitoring devices is able to work on its own and independent from the functionality of the monitoring device dedicated to any other optical transmission link 1.

The embodiment shown in FIG. 5 is similar to the embodiment according to FIG. 4. However, a single optical transmitter 170 is used instead of a respective number of single optical transmitters 17 each of which is comprised by a respective monitoring device and dedicated to a selected one of the PtP transmission links 1. The control unit 23 performs all tasks that may be required as explained above with reference to the embodiment shown in FIG. 1.

The monitoring signal $S_{mon}$ created by the optical transmitter 170 is supplied to a common port of an optical 1:N power splitter 172, wherein N is the number of optical transmission links 1. Each of the splitting ports of the optical power splitter 172 is connected to a respective one of the optical splitter/combiners 15. Of course, in this embodiment, the monitoring signal $S_{mon}$ is simultaneously supplied to each of the optical coupler devices 13 and the optical PtP transmission links, respectively. The signals to be monitored, i.e. the reflecting monitoring signals $S_{mon, r}$ and the split-off portions of the upstream signals $S_{US}$ are monitored using the separate optical receivers 21.

In this case, a transmitter arrangement 372 having a given number of output ports consists of the optical transmitter 170 and the optical power splitter 172, the splitting ports of the optical power splitter 172 defining an output port of the transmitter arrangement 372. The receiver arrangement 380 is identical to the receiver arrangement 380 in the embodiment according to FIG. 4.

In another embodiment (not shown), it would also be possible to use separate optical transmitters 17 as shown in FIG. 4 and to use a single optical receiver 21 having an input port that is connected to a common board of an optical power splitter having splitting ports which are connected to respective splitting ports of the optical splitter/combiners 15. However, in this case, a single optical transmission link can be monitored at a time, only without additional effort.

This embodiment could further be amended by using a single tunable optical transmitter instead of separate optical transmitters 17, the output port of the tunable optical transmitter being connected to a WDM port of a demultiplexer, for example an AWG. Thus, the tunable optical transmitter can be tuned to a number of N monitoring wave-lengths each of which is output at a different demultiplexing port of the demultiplexer and supplied to a respective PtP transmission link. The reflected monitoring signal $S_{mon, r}$ is then detected by the single optical receiver. Of course, it would also be possible to use a number of N separate optical receivers in a further alternative.

When using a single optical transmitter in connection with an optical splitter that combines the signals output by the various optical splitter/combiners 15, a control unit must be used which is configured to control only one of the optical coupler devices 13 to work in the second work mode at a time. Otherwise, the different upstream signals $S_{US}$ would be supplied to the optical receiver at the same time, which would lead to interferences.

In this case it would, however, be possible to use different wavelengths for the upstream signals and a tunable optical receiver configured to optically filter a selected one of the upstream signals which could then correctly be monitored.

FIG. 6 shows a monitoring device in the form of a single device, for example a monitoring card that can be plugged into a higher-level assembly, which is configured to monitor a plurality of four PtP transmission links 1. In the specific embodiment shown in FIG. 6, the monitoring device 200 is configured to monitor a number of four PtP transmission links. The monitoring device comprises, for each PtP transmission link to be monitored, a first optical port $230a_1$ to $230a_4$ and a second optical port $230b_1$ to $230b_4$. Each of the first and second optical ports $230a_1$ to $230a_4$, $230b_1$ to $230b_4$ is connected to or defines the respective first or second optical port of an optical coupler device 13 as explained above with reference to FIGS. 1 and 2. As described above, for each of the optical PtP transmission links to be monitored (and which are connected to the optical ports $230a_1$ to $230a_4$ and $230b_1$ to $230b_4$, respectively), a splitter/combiner 15, an optical transmitter 17 and an optical receiver 21 are provided. The optical connections between these components may be realized by optical paths which may be manufactured using an integrated optics technology.

A control unit 230 may also be provided on the multi-port monitoring card according to the optical monitoring device 200 shown in FIG. 6. The control unit 230 is configured to control the optical transmitter and the optical coupler devices 13 (more precisely, the control means thereof) as described above. If a selected PtP transmission link 1 is to be monitored, the respective optical transmitter 17 is activated by the control unit 230. Further, the respective optical coupler device 13 is controlled to operate in the first work mode, i.e. the work mode in which the respective optical fiber link 3 is monitored using the monitoring signal. If an upstream signal of a selected optical PtP transmission link is to be monitored, the respective optical transmitter 17 is deactivated and the respective optical coupler device 13 is controlled to operate in the second work mode, in which a portion of the respective upstream signal is split off and supplied to the respective optical receiver 21.

As indicated in FIG. 6, all controllable three-port devices comprised by the optical coupler devices 13, which may be realized as temperature-sensitive three-port devices, are realized on a common substrate 210. The temperature-sensitive optical three-port devices are provided on the common substrate 210 in such a manner that they are in sufficient thermal contact with the common substrate 210. In this case, it is possible to use a single control means, for example a single heating and/or cooling device, if the monitoring device 200 shall be configured to simultaneously monitor all transmission links connected thereto in the same manner, i.e. to monitor either the optical fiber link or the upstream signals.

As shown in FIG. 6, the common heating and/or cooling device may comprise several partial units each of which is at the location of the respective optical coupler device or the respective temperature-sensitive three-port device. In this case, all of the partial units can be controlled using a single control signal created by the control unit 230.

As shown in FIG. 6, the optical paths connecting the various components and ports may reveal crossings with each other. If these optical paths are realized in integrated optic technology the crossings should be made at a right angle in order to avoid any undesired splitting of the signals guided in the crossed paths.

Of course, as explained above in connection with FIGS. 4 and 5, instead of separate optical transmitters and receivers, combinations of a single optical receiver and an optical power splitter or optical demultiplexer and/or a combination of an optical power splitter and a single optical receiver may be used. The function of the control unit must then be adapted correspondingly.

In all of these embodiments, the invention makes it possible to monitor a single or a plurality of point-to-point transmission links with respect to the optical fiber link (fiber monitoring) or with respect to the upstream signal. Using a controllable optical coupler device according to the present invention has the advantage that the upstream signal is attenuated in case of active monitoring, only, whereas if no monitoring is necessary practically no optical attenuation is introduced into the optical fiber link.

LIST OF REFERENCE SIGNS

1 PtP transmission link
3 optical fiber link
5 first (near-end) transceiver
7 second (far-end) transceiver
9 single fiber
11 optical reflector
13 optical coupler device
13a first port
13b second port
13c third port
15 passive optical splitter/combiner 15a common port
15b first splitting port
15c second splitting port
17 optical transmitter
19 control means
21 optical receiver
30 optical power splitter
30a common port
30b first splitting port
30c second splitting port
32 optical diplexer
32a WDM port
32b first band port
32c second band port
34 optical diplexer
34a WDM port
34b first band port
34c second band port
170 optical transmitter
172 optical 1×N power splitter
200 monitoring device
210 common substrate
230 control unit
370 transmitter arrangement
372 transmitter arrangement
380 receiver arrangement
$S_{DS}$ optical downstream signal
$S_{US}$ optical upstream signal
$\lambda_1$ downstream wavelength
$\lambda_2$ upstream wavelength
$\lambda_3$ monitoring wavelength
$S_{mon}$ optical monitoring signal
$S_{ctrl}$ control signal

The invention claimed is:

1. An optical coupler device, especially for monitoring purposes in an optical point-to-point transmission link, comprising:
(a) a first, a second and a third optical port;
  (i) the optical coupler device being configured to transmit a first optical signal received at the first optical port to the second optical port and to transmit a second optical signal received at the second optical port to the first and third optical port according to a monitoring split ratio with respect to the optical power of the second optical signal the first and second optical signal having a wavelength lying in a first optical band; and
  (ii) the optical coupler device being further configured to transmit a third and a fourth optical signal received at the third and the second optical port to the respective other optical port, the third and fourth optical signal having a wavelength lying in a second optical band;
wherein
(b) the optical coupler device is configured to be controllable with respect to the monitoring split ratio,
(c) the optical coupler device further comprises a control means adapted to receive a control signal and configured to control the optical coupler device with respect to the monitoring split ratio in such a way that
  (i) in a first work mode the second optical signal is transmitted to the first optical port, only, and
  (ii) in a second work mode a major portion of the optical power of the second optical signal is transmitted to the first optical port and a minor portion of the optical power of the second signal is transmitted to the third optical port,
(d) the optical coupler device further comprises:
  (i) a wavelength-independent optical power splitter having a common port and a first and a second splitting port, the optical power splitter being controllable with respect to the splitting ratio, and
  (ii) a first and a second optical diplexer each having a WDM port and a first and a second band port each optical diplexer being configured to receive an optical signal in the first and second optical band at the first and second band port, respectively, and to output the optical signals at the WDM port, and to output optical signals in the first and second optical band which are received at the WDM port at the first and a second band port, respectively,
wherein the first splitting port of the optical power splitter is connected to or defines the first optical port of the optical coupler device, wherein the second splitting port is connected to the first band port of the first optical diplexer, wherein the common port of the optical power splitter is connected to the first band port of the second optical diplexer, wherein the second band port of the second optical diplexer is connected to the second band port of the first optical diplexer, wherein the WDM port of the second optical diplexer is connected to or defines the second optical port of the optical coupler device, and wherein the WDM port of the first optical diplexer is connected to or defines the third optical port of the optical coupler device.

2. The optical coupler device according to claim 1, wherein it comprises a wavelength-dependent 1×2 coupler.

3. The optical coupler device according to claim 2, wherein the wavelength-dependent 1×2 coupler is a temperature sensitive coupler and the control means is a heating and/or cooling device, which is thermally coupled with the temperature-sensitive coupler and configured to switch the optical coupler device between the two work modes depending on the control signal received.

4. The optical coupler device according to claim 2, wherein the wavelength-dependent 1×2 coupler is a fused silica or polymer-based 1×2 coupler.

5. The optical coupler device according to claim 1, wherein the controllable optical power splitter is a temperature-sensitive power splitter and the control means is a heating and/or cooling device, which is thermally coupled with the temperature-sensitive power splitter and configured to switch the optical coupler device between the two work modes depending on the control signal received.

6. The optical coupler device according to claim 1, wherein the wavelength-independent optical power splitter is asymmetrical.

7. An optical monitoring device for monitoring an optical point-to-point transmission link comprising:
an optical coupler device comprising:
(a) first, a second and a third optical port;
  (i) the optical coupler device being configured to transmit a first optical signal received at the first optical port to the second optical port and to transmit a second optical signal received at the second optical port to the first and third optical port according to a monitoring split ratio with respect to the optical power of the second optical signal the first and second optical signal having a wavelength lying in a first optical band; and
  (ii) the optical coupler device being further configured to transmit a third and a fourth optical signal received at the third and the second optical port to the respective other of the third and the second optical port, the third and fourth optical signal having a wavelength lying in a second optical band;

wherein (b) the optical coupler device is configured to be controllable with respect to the monitoring split ratio, and (c) the optical coupler device further comprises a control means adapted to receive a control signal and configured to control the optical coupler device with respect to the monitoring split ratio in such a way that
  (i) in a first work mode the second optical signal is transmitted to the first optical port, only, and
  (ii) in a second work mode a major portion of the optical power of the second optical signal is transmitted to the first optical port and a minor portion of the optical power of the second optical signal is transmitted to the third optical port;

the optical monitoring device further comprising:

(a) a first and a second optical port being connected to or defined by the first and second optical port of the optical coupler device;

(b) an optical transmitter adapted to create an optical monitoring signal at a wavelength lying in the second optical band of the optical coupler device;

(c) an optical receiver capable of receiving signals lying in the first and second optical bands; and (d) a passive optical splitter/combiner having a common port and a first and a second splitting port, the common port being connected to the third optical port of the optical coupler device, the first splitting port being connected to an optical output port of the optical transmitter and the second splitting port being connected to an optical input port of the optical receiver, (e) with the passive optical splitter/combiner being configured to transmit to the common port at least a portion of the optical power of the optical monitoring signal created by the optical transmitter and supplied to the first splitting port and to transmit to the second splitting port at least a portion of the optical power of an optical signal supplied to the common port.

8. The optical monitoring device according to claim 7, further comprising a control unit configured to be able to control the optical transmitter and the optical coupler device to work in a first and a second monitoring mode, wherein in the first monitoring mode the optical transmitter creates a monitoring signal and the optical coupler device is in the first work mode, and in the second monitoring mode the optical transmitter is deactivated and the at least one optical coupler device is in the second work mode.

9. An optical monitoring device for monitoring a plurality of optical point-to-point transmission links comprising:

a plurality of optical coupler devices each comprising:

(a) a first, a second and a third optical port;
  (i) the optical coupler device being configured to transmit a first optical signal received at the first optical port to the second optical port and to transmit a second optical signal received at the second optical port to the first and third optical port according to a monitoring split ratio with respect to the optical power of the second optical signal the first and second optical signal having a wavelength lying in a first optical band; and
  (ii) the optical coupler device being further configured to transmit a third and a fourth optical signal received at the third and the second optical port to the respective other of the third and the second optical port, the third and fourth optical signal having a wavelength lying in a second optical band;

wherein (b) the optical coupler device is configured be controllable with respect to the monitoring split ratio, and (c) the optical coupler device further comprises a control means adapted to receive a control signal and configured to control the optical coupler device with respect to the monitoring split ratio in such a way that
  (i) in a first work mode the second optical signal is transmitted to the first optical port, only, and
  (ii) in a second work mode a major portion of the optical power of the second optical signal is transmitted to the first optical port and a minor portion of the optical power of the second optical signal is transmitted to the third optical port;

the optical monitoring device further comprising:

(a) an optical transmitter arrangement having a plurality of output ports and being adapted to create, at each output port, an optical monitoring signal, each of which has a wavelength lying in the second optical band of the optical coupler device;

(b) an optical receiver arrangement having a plurality of input ports and being adapted to receive, at each input port, an optical signal having a wavelength lying in the first and second optical bands;

(c) a plurality of passive optical splitter/combiners, each of which is dedicated to one of the optical coupler devices, each passive optical splitter/combiner having a common port and a first and a second splitting port, the common port being connected to the third optical port of the dedicated optical coupler device, the first splitting port being connected to a dedicated optical output port of the optical transmitter arrangement and the second splitting port being connected to a dedicated optical input port of the optical receiver arrangement, each passive optical splitter/combiner being configured to transmit to the common port at least a portion of the optical power of the optical signal created by the optical transmitter arrangement and received at the first splitting port and to transmit to the second splitting port at least a portion of the optical power of the optical signal received at the common port and (d) wherein each of the plurality of optical coupler devices is configured to be connected to a first end and a second end of a dedicated optical point-to-point transmission link.

10. The optical monitoring device according to claim 9, further comprising a control unit adapted to receive at least one control signal and configured to be able to control, depending on the at least one control signal, the optical transmitter arrangement and the optical coupler devices to work in a first and a second monitoring mode with respect to one or more predetermined or all optical point-to-point transmission links, wherein in the first monitoring mode with respect to a selected optical point-to-point transmission link the optical transmitter arrangement creates a monitoring signal which is supplied to the selected optical point-to-point transmission links via the dedicated passive optical splitter/combiner and the dedicated optical coupler device, and the optical coupler device is in the first work mode, and wherein in the second monitoring mode the transmitter arrangement does not create one or more monitoring signals which are supplied to the selected optical point-to-point transmission links via the dedicated passive optical splitter/combiner and the dedicated optical coupler device, and the optical coupler device is in the first work mode.

11. The optical monitoring device according to claim 9, wherein the optical transmitter arrangement comprises at least one optical transmitter having an output port which is connected to an input port of a dedicated optical power splitter having a predetermined number of output ports, each output port defining an output port of the optical transmitter arrangement.

12. The optical monitoring device according to claim 9, wherein the optical transmitter arrangement comprises at least one tunable optical transmitter having an output port which is connected to an input port of a dedicated optical demultiplexing device, e.g. an arrayed waveguide grating, the optical demultiplexing device having a predetermined number of output ports, each output port defining an output port of the optical transmitter arrangement, wherein the tunable optical transmitter is controllable by the control unit to create a monitoring signal having such a monitoring wavelength that the control signal is output at the output port of the optical demultiplexing device, which defines the output port of the optical transmitter arrangement that is dedicated to a respective dedicated optical point-to-point transmission link.

13. The optical monitoring device according to claim 9, wherein the optical transmitter arrangement comprises one or more optical transmitters having an output port, which defines an output port of the optical transmitter arrangement.

14. The optical monitoring device according to claim 9, wherein the optical receiver arrangement comprises at least one optical receiver having an input port which is connected to an output port of a dedicated optical power splitter having a predetermined number of input ports, each input port defining an input port of the optical receiver arrangement.

15. The optical monitoring device according to claim 9, wherein the optical receiver arrangement comprises one or more optical receivers having an input port, which defines an input port of the optical receiver arrangement.

16. The optical monitoring device according to claim 9, wherein the plurality of optical coupler devices comprises a common control means configured to commonly control each of the plurality of optical coupler devices into the first or second work mode depending on a common control signal.

17. The optical monitoring device according to claim 16, wherein the plurality of optical coupler devices are temperature-sensitive optical coupler devices and the common control means is a common heating device, each of the optical coupler devices being provided in thermal contact with the common heating device.

18. The optical monitoring device according to claim 9, wherein at least one of the plurality of optical coupler devices is configured to be connected to a near end and a far end of the dedicated optical point-to-point transmission link.

* * * * *

UNITED STATES PATENT AND TRADEMARK OFFICE
CERTIFICATE OF CORRECTION

PATENT NO.         : 9,917,640 B2
APPLICATION NO.    : 14/750225
DATED              : March 13, 2018
INVENTOR(S)        : Klaus Grobe Page 1 of 1

It is certified that error appears in the above-identified patent and that said Letters Patent is hereby corrected as shown below:

In the Specification

Column 1, Line 5, below LINKS, insert:
-- CROSS-REFERENCE TO RELATED APPLICATION
This application claims priority to European Patent Application No. 14 002 194.0 filed Jun. 26, 2014, the disclosure of which is hereby incorporated in its entirety by reference. --

In the Claims

Column 15, Line 51, Claim 1, after "other" insert -- of the third and the second --

Column 15, Line 64, Claim 1, after "second" insert -- optical --

Column 15, Line 66, Claim 1, after "second" insert -- optical --

Column 16, Line 7, Claim 1, delete "port" and insert -- port, -- (Second Occurrence)

Column 16, Line 55, Claim 7, before "first," insert -- a --

Column 18, Line 4, Claim 9, after "configured" insert -- to --

Signed and Sealed this
Tenth Day of July, 2018

Andrei Iancu
*Director of the United States Patent and Trademark Office*